Feb. 23, 1965 W. PERA 3,171,088
PHASE-SPLITTER CIRCUIT FOR USE WITH AN AUDIO AMPLIFIER
Filed Jan. 25, 1962
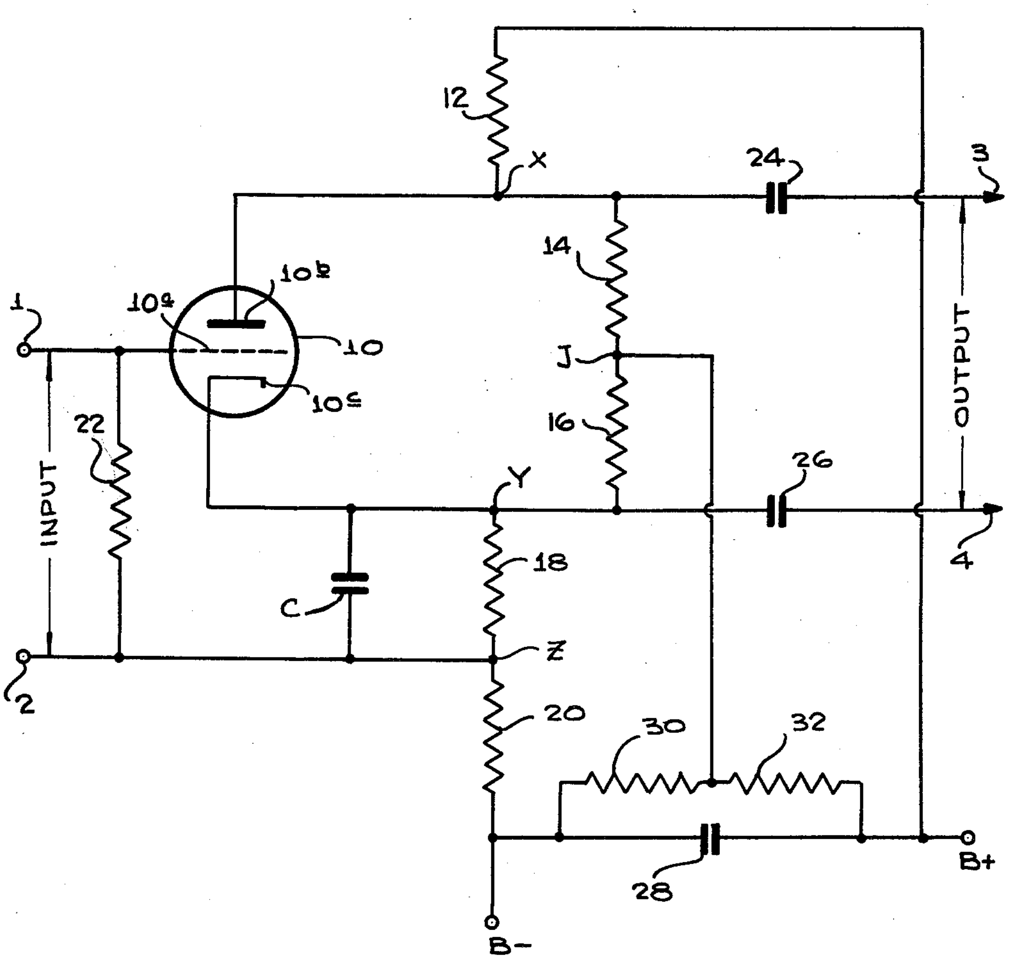
INVENTOR
WILLIAM PERA
BY Shoemaker and Mattare
ATTORNEYS United States Patent Office 3,171,088
Patented Feb. 23, 1965

3,171,088

PHASE-SPLITTER CIRCUIT FOR USE WITH AN AUDIO AMPLIFIER

William Pera, 6122 Main St., Lanham, Md.
Filed Jan. 25, 1962, Ser. No. 168,693
2 Claims. (Cl. 330—117)

This invention relates to electronic amplifier circuits, and particularly to improvements in phase splitter circuits having utility in connection with the driving of push-pull output stages for high fidelity audio amplifiers, and in connection with other uses of phase-splitter type circuits.

It is an object of the invention to provide an improved phase splitter circuit employing equal resistance in the cathode and plate circuits of a triode and further including a resistance chain coupled in parallel with the triode and having a mid-point coupled to a mid-point in the B voltage supply, said mid-points being stabilized at one half the supply voltage to provide more stable phase-splitter operation and to provide a low impedance path back to the power supply to drain off hum and other noise components.

Another object of the invention is to provide a phase-splitter circuit as set forth above having relatively low value load resistances so that very large coupling capacitors can be used from these resistances to the grids of the push-pull power amplifier stages without serious loss of high-frequency signal components due to stray capacity between these capacitors and ground.

Another major object of this invention is to provide a phase-splitter circuit which is precisely balanced and symmetrical in its operation, wherein the source of potential is directly returned to a center-tapped resistor chain coupled directly across the output terminals in the output circuit of the amplifier, and wherein the input to the amplifier is coupled between the grid and the cathode, the latter input terminal being separate from the common terminal between the cathode load resistance and the minus terminal of the source of operating potential.

Other objects and advantages of this invention will become apparent during the following discussion of the drawing, wherein:

The drawing illustrates schematically an embodiment of the invention suitable for use as a phase splitter; for instance, for driving the grids of a push-pull power amplifier.

Referring to the details of the drawings, the phase-splitter amplifier comprises a vacuum tube triode having a grid 10*a* directly coupled to an input terminal 1, and having a plate 10*b* and a cathode 10*c* connected as set forth hereinafter.

A plate voltage supply (not shown) is connected between B(−) and the terminal labeled B(+) and supplies the operating potentials and currents required by the tube 10.

The amplifier circuit includes a resistance chain 12, 14, 16, 18 and 20 connected across the power supply, the resistance 18 being small as compared with the other resistances in the chain and serving principally to self bias the tube 10. The cathode 10*c* is connected to the upper end of the resistance 18 and the other input terminal 2 is connected to the lower end thereof, the grid being maintained at the voltage level of the lower end of the resistance 18 by the grid resistance 22. If desired, a by-pass capacitor C may be connected across the bias resistor 18, as is well known in the art.

Returning to the resistance chain, the resistance 18 can be eliminated from the following consideration of the main resistances 12, 14, 16 and 20 because the former is only about 2% of the value of the smallest of the latter resistances. In prior art phase-splitter circuits of this general type, the load resistances comprise the resistors 12 and 20 which are generally equal in value so that the outputs taken from the points X and Y by the coupling capacitors 24 and 26 will be equal in amplitude, though opposite in phase. Note that the same current flows through resistances 12 and 20.

However, prior art phase-splitter circuits have not taught the addition of the resistances 14 and 16 across the cathode-plate circuit of the tube 10, nor the return of the common junction J therebetween to a voltage divider 30, 32 across the power supply, which is incidentally by-passed by a suitable capacitor 28. The resistances 30 and 32 are selected equal so that the point J is always maintained substantially at one-half the voltage of the power supply, thereby stabilizing the mid-point of the resistance chain and also providing a lower-impedance path to drain off stray noise and hum pickup components.

The output across the terminals 3 and 4 can be coupled to the grids of a push-pull amplifier circuit, this circuit having the particular advantage that relatively large coupling capacitors 24 and 26 can be used in a high-fidelity amplifier without loss of high-frequency components due to body capacity of the capacitor plates to ground because the load resistances 12 and 20 are relatively low in value. These capacitors 24 and 26 can be made equal to 0.5 microfarad or even larger until the impedance to ground caused by body capacity as measured at the highest frequency involved approaches about ten times the resistance of the load resistor 12 or 20.

The following numerical example provides a practical amplifier for purposes of illustration, but not limitation:

| | |
|---|---|
| Resistances **12** and **20** | 10,000 ohms. |
| Resistances **14**, **16**, **30** and **32** | 25,000 ohms. |
| Resistance **22** | 500,000 ohms. |
| Resistance **18** | 200 ohms. |
| Capacitors **24** and **26** | 0.5 microfarad. |
| Power supply B+ | 360 volts. |
| Voltage measured B(−) terminal to Y | 122 volts. |
| Voltage measured B(−) terminal to X | 240 volts. |
| Voltage measured B(−) terminal to J | 180 volts. |
| Voltage measured Y terminal to Z | (−) 2 volts. |

This invention is not limited to the embodiment illustrated in the drawing for obviously, changes may be made within the scope of the following claims.

I claim:

1. A phase splitter amplifier circuit, comprising a vacuum tube amplifier having a control grid comprising its input terminal and having plate and cathode terminals respectively comprising the output terminals of said amplifier; a source of operating potential; load resistances respectively coupling said output terminals to opposite terminals of said source; voltage divider means connected across said source and having a center tap; and resistor means connected across said output terminals and defining with said tube a parallel D.C. circuit and having a center tap connected directly to the first-mentioned center tap.

2. A phase splitter circuit, comprising a vacuum tube having a grid, a cathode and a plate; input terminals for applying an input signal between the grid and the cathode; output terminals connected to said plate and to said cathode; a source of operating potential having opposed terminals and having a center tap maintained at a potential mid-way between the potentials of said opposed terminals; load impedances each coupled between one of the respective opposed terminals and one of said output terminals; and resistor means connected across said output terminals and having a center tap connected directly to said first-mentioned center tap and defining an uninterrupted D.C. path between said center taps.

References Cited by the Examiner

UNITED STATES PATENTS

| | | | |
|---|---|---|---|
| 2,844,777 | 7/58 | Ross | 330—117 |
| 3,015,780 | 1/62 | Schayes et al. | 330—14 |

ROY LAKE, *Primary Examiner.*

JOHN KOMINSKI, *Examiner.*